United States Patent [19]
Bessette et al.

[11] Patent Number: 5,621,294
[45] Date of Patent: Apr. 15, 1997

[54] APPARATUS AND METHOD FOR FORCE COMPENSATION IN A VARIABLE RELUCTANCE MOTOR

[75] Inventors: Steven C. Bessette, Maine; Andrew Zalesski, Apalachin, both of N.Y.

[73] Assignee: Universal Instruments Corporation, Binghamton, N.Y.

[21] Appl. No.: 561,315

[22] Filed: Nov. 21, 1995

[51] Int. Cl.$^6$ .................................................. H02P 8/00
[52] U.S. Cl. ........................... 318/701; 318/605; 318/573; 318/696
[58] Field of Search ...................... 318/560–649, 318/699–839; 364/474.28, 474.3, 474.32, 474.17; 395/80, 82, 85, 89

[56] References Cited

U.S. PATENT DOCUMENTS

| | | | |
|---|---|---|---|
| 3,899,728 | 8/1975 | Hoppe . | |
| 4,618,808 | 10/1986 | Ish-Shalom et al. | 318/696 |
| 4,695,783 | 9/1987 | Shero et al. | 318/808 |
| 4,910,449 | 3/1990 | Hiyama et al. . | |
| 4,980,617 | 12/1990 | Tajima et al. . | |
| 5,159,251 | 10/1992 | Sasaki et al. | 318/572 |
| 5,173,645 | 12/1992 | Naito . | |
| 5,221,884 | 6/1993 | Teshima | 318/569 |
| 5,229,698 | 7/1993 | Minnich et al. | 318/568.15 |
| 5,256,952 | 10/1993 | Yoneyama et al. . | |
| 5,274,313 | 12/1993 | Amrhein . | |
| 5,319,273 | 6/1994 | Hockney et al. . | |
| 5,319,294 | 6/1994 | Ohto et al. . | |
| 5,349,278 | 9/1994 | Wedeen . | |
| 5,350,989 | 9/1994 | Wedeen . | |
| 5,352,962 | 10/1994 | Galburt . | |
| 5,374,883 | 12/1994 | Morser | 318/605 |
| 5,378,967 | 1/1995 | Naito . | |
| 5,434,489 | 7/1995 | Cheng et al. | 318/568.15 |
| 5,479,353 | 12/1995 | Nakamura | 364/474.17 |
| 5,568,389 | 10/1996 | McLaughlin et al. | 364/424.05 |

OTHER PUBLICATIONS

Texas Instrument TMS320C50 System, selected pages from brochure.

Heidenhain GmbH product brochure, "Exposed Linear Encoders Measuring Steps 1 μm to 0.5 μm/0.1 μm LIDA, LIF", p. 13.

Alfons Ernst, "Digital Linear and Angular Metrology—Position Feedback Systems for Machines and Device", 1989, pp. 4–29.

*Primary Examiner*—Paul Ip
*Attorney, Agent, or Firm*—Banner & Witcoff, Ltd.

[57] ABSTRACT

A controller for force compensation in a variable reluctance motor includes a sensor coupled to the variable reluctance motor for obtaining instantaneous motor position data and a controller coupled to the sensor for receiving the instantaneous motor position data and desired force command. The controller includes a circuit for comparing the instantaneous motor position data and the desired force command with a plurality of stored data points. Each stored data point represents a phase current value. The comparing circuit identifies a selected stored data point having position and desired force command values numerically closest to the instantaneous motor position data and the desired force command. The controller also includes a circuit for interpolating a desired phase current value based on the phase current value of the selected stored data points; a circuit for generating a current having the desired phase current values; and a circuit for outputting the current to the variable reluctance motor. A method of force compensation in a variable reluctance motor includes the steps of obtaining instantaneous motor position data for the variable reluctance motor; using a truncated value of the instantaneous motor position and desired force command to identify a selected stored data points from a plurality of stored data points; interpolating a desired phase current value based on the selected stored data; and applying a current having the desired phase current value to the variable reluctance motor. The selected data points are numerically closest to the instantaneous motor position data and the desired force command and the stored data points each represent a phase current value.

10 Claims, 9 Drawing Sheets

FIG. 3A
Section which contains desired output value $\angle a \cong \angle b$
$\angle c \cong \angle d$

APPARATUS AND METHOD FOR FORCE COMPENSATION IN A VARIABLE RELUCTANCE MOTOR

FIELD OF THE INVENTION

The present invention relates to an apparatus and method for compensating for nonlinearities in a variable reluctance motor to achieve a desired force output. The present invention further relates to an apparatus and method for varying one or more phase current inputs into a variable reluctance motor to achieve a constant force output while compensating for nonlinearities relating to the interaction of the components of the motor.

BACKGROUND OF THE INVENTION

Figure 1:
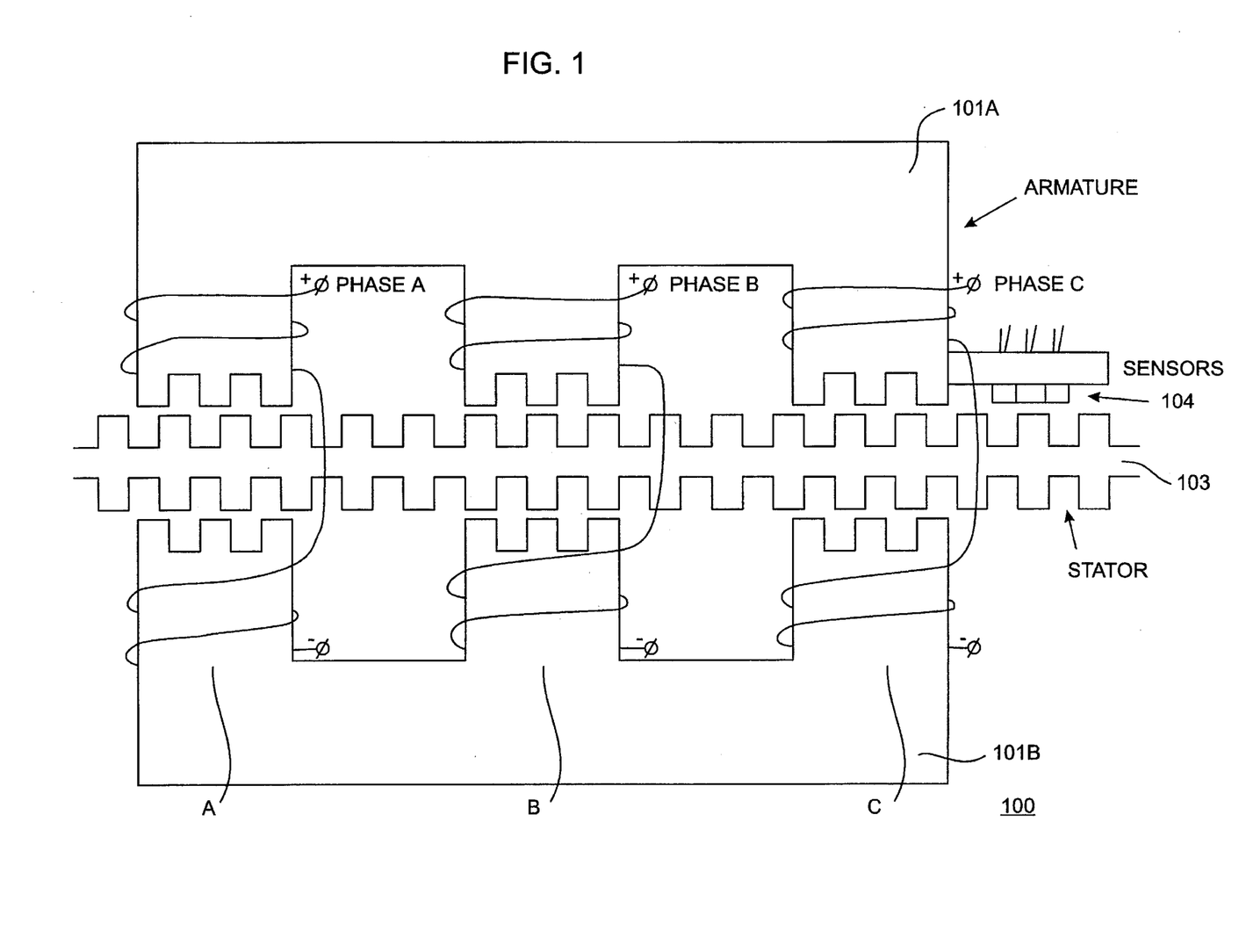
FIG. 1 provides a diagram of a variable reluctance motor.

In the past, variable reluctance motors have not been used in high accuracy servo systems which require fast settling time and precision positioning due to high force ripple and other nonlinearities. One example of such a variable reluctance motor is a coupled linear three phase variable reluctance motor 100 shown in FIG. 1. With reference to FIG. 1, the coupled linear three phase variable reluctance motor 100 comprises a stator 103 and an armature 101A and 101B including three phases A, B, and C. Each phase includes a coil which applies a current to the phase, thereby generating a magnetic field which causes the armature 101A and 101B to move with respect to the stator 103. A controller (not shown) provides a desired current at a selected time to each phase of the armature 101A and 101B to produce a desired force output. One or more sensors 104 are provided to detect the position of the armature 101A and 101B in relation to the stator 103.

A problem associated with known variable reluctance motor controllers is a relatively high force ripple, or variation in the force output, that results from the interaction of the armature and stator of the motor. For example, the force in the axis of motion with respect to the current varies non-linearly with respect to the relative position of the armature to the stator. As the relative position between the stator and armature changes, the tooth overlap position changes, and thus the relative reluctance path changes. As a result, the flux distribution between the three legs of the armature changes, and the amount of flux available at a given current as well as the percentage of the flux contributing to a flux in the linear direction changes. The force in the axis of motion also varies nonlinearly with respect to the magnitude of the current due to saturation effects. These types of localized nonlinear variations result from changes in the resultant force vector and the magnetic saturation characteristics of the motor. As a result of these nonlinear variations, the motor does not provide a linear force output with respect to phase current and position.

In order to maintain a low linear force ripple throughout an entire range of force levels of a variable reluctance linear motor and thereby achieve a relatively constant force output, a highly complex commutation method is needed to compensate for these variations. Further, the commutation method must also compensate for localized magnetic saturation effects due to air gap and current to control the force ripple of the motor.

One possible commutation method which may be used to control the magnitude of the force ripple includes the use of a table in which current corrections for all possible behaviors of the motor are stored. Based on the position of the motor components as sensed by the sensor(s) and the force output desired, a required phase current value is located in the table for each phase, and a corresponding current is provided to the phases of the motor. However, such a table requires a large amount of fast memory and is therefore expensive to implement.

A second possible commutation method includes the use of a complex algorithm for calculating the necessary phase currents based on empirical data obtained from the motor. However, the computer processing power necessary to perform the complex calculations in real time needed to control the force ripple requires a highly complex processor and/or a sacrifice in bandwidth due to the computation time required.

SUMMARY OF THE INVENTION

It is an object of the present invention to provide an apparatus and method for compensating for the nonlinearities in a variable reluctance motor while maintaining a high bandwidth and optimizing hardware requirements.

In an apparatus and method according to the present invention, a series of sets of data are empirically or mathematically derived for the motor at different force levels and relative positions. Then, a subset of this data is stored in a memory representing the system in a lower resolution form. Third, the stored points corresponding to the position and desired force output of the operating motor are identified. Fourth, the stored points are used to interpolate the phase current needed to achieve a high resolution force output based on the instantaneous position of the motor and desired force command. In this way, the memory and processing requirements of the controller are reduced, thus optimizing hardware requirements for the controller, and a high bandwidth is maintained.

An apparatus for force compensation in a variable reluctance motor according to the present invention includes a sensor coupled to the variable reluctance motor for obtaining instantaneous motor position data; and a controller coupled to the sensor for receiving the instantaneous motor position data and a desired force command requirement of the motor. The controller includes a circuit for comparing the instantaneous motor position data and the desired force command with a plurality of stored data points, wherein each stored data point represents a phase current value. The comparing circuit identifies a selected stored data points in a lower resolution form which encomposses the position and force values of the instantaneous motor position data and the desired force command respectively. The controller also includes a circuit for interpolating a desired phase current value based on the phase current value of the selected stored data points, a circuit for generating a current having the desired phase current value; and a circuit for outputting the current to the variable reluctance motor.

A method according to the present invention includes the steps of obtaining instantaneous motor position data for the variable reluctance motor; using a truncated value of the instantaneous motor position and desired force command to identify a selected stored data point from a plurality of stored data points; interpolating a desired phase current value based on the selected stored data; and applying a current having the desired phase current value to the variable reluctance motor. The selected data points are numerically closest to the instantaneous motor position data and the desired force command, and the stored data points each represent a phase current value.

The foregoing and other features, aspects, and advantages of the present invention will become more apparent from the following detailed description when read in conjunction with the accompanying drawings.

DETAILED DESCRIPTION

The apparatus and method for force compensation in a variable reluctance motor according to the present invention will now be described in detail with reference to FIGS. 2–6.

Figure 2:
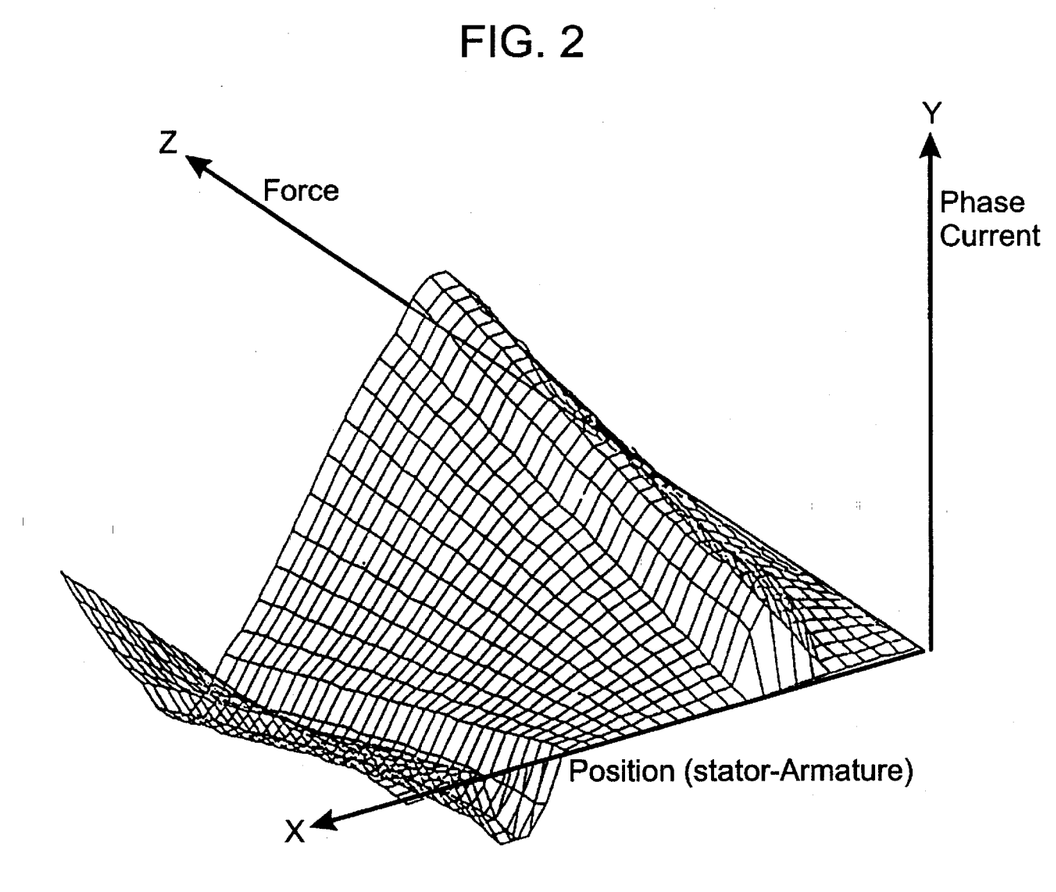
FIG. 2 provides a three-dimensional graph of the force/position plane of the variable reluctance motor of FIG. 1, including relative position of the stator to the armature, the force output, and the phase current input to one phase of the motor of FIG. 1.

FIG. 2 provides a graph of the relationship between the armature/stator displacement (relative horizontal position) (X-AXIS), the desired force command (Z-AXIS) of the motor, and the current to be sent to a particular phase (Y-AXIS) to achieve the desired force output. Thus, the graph in FIG. 2 illustrates the force/behavior plane of one phase of the variable reluctance motor shown in FIG. 1.

According to the apparatus and method of the present invention, once a force/position plane such as that shown in FIG. 2 has been developed for the motor 100, the current required in each phase at a specific motor position can be determined to achieve a desired force output. However, as discussed above, in order to store all of the data for a high accuracy system in the force/position plane of FIG. 2, a large memory is required. Therefore, to avoid the need for a large controller memory, in the apparatus and method of the present invention, data points representing a lower resolution of position and force are shown as the intersections of the lines shown in FIG. 2 are stored in a memory coupled to the controller of the motor. Each data point includes a phase current value in a memory array defined by force and position. In this manner, a lower resolution model of the operation of the motor 100 is stored.

Figure 3A:
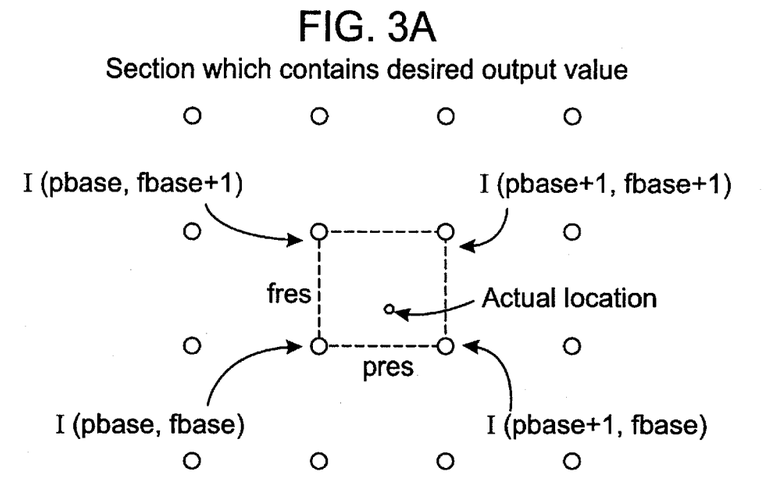
FIGS. 3A and 3B provide illustrations of the interpolation function of a commutation controller according to the present invention.
Figure 3B:
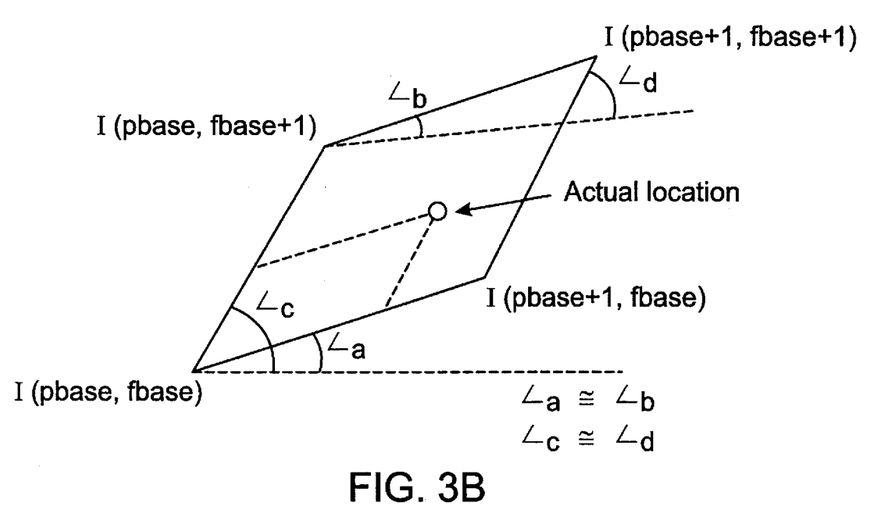

With reference to FIGS. 3A and 3B, in the apparatus and method according to the present invention, the amount of phase current to be supplied to the motor 100 is calculated as follows.sensor readings are obtained from the sensor(s) 104 shown in FIG. 1. These sensor readings provide the instantaneous position of the stator 103 with respect to the armature 101A and 101B. Based on these sensor readings and the desired force command, the processor identifies the stored low resolution data points that enclose the actual phase current required to produce the desired force at a higher resolution. As a result, the portion of the force/position plane of FIG. 2 needed to calculate the necessary phase current input to the motor is identified.

In a preferred embodiment, to simplify the software structure of the processor, the dimensions of the storage array are chosen such that the resolution of the position data and force command data are smaller than the actual resolution of the system, for example, reduced by powers of two. With this approach, the proper power of two of the force command and the position feedback may determine the location of the closest stored data point $I_{(pbase,fbase)}$ at any time by bit shifting to the right. An example of a calculation process according to the present invention is provided below.

EXAMPLE

Given: Relative Position resolution is $2^{12}$
Force Command resolution is $2^{16}$
Position Segment to be used is $2^5$
Force Segment to be used is $2^{11}$

| | | | | | |
|---|---|---|---|---|---|
| (1) Force command = | xxxx, | xxxx, | xxxx, | xxxx | binary |
| (2) AND with | 1111, | 1000, | 0000, | 0000 | binary |
| - Result | xxxx, | x000, | 0000, | 0000 | binary |
| (3) Shift right 4 places | 0000, | xxxx, | x000, | 0000 | binary |
| (4) Get position feedback | 0000, | xxxx, | 0xxx, | xxxx | binary |
| (5) AND with | 0000, | 1111, | 1110, | 0000 | binary |
| - Result | 0000, | xxxx, | xxx0, | 0000 | binary |
| (6) Shift right 5 places | 0000, | 0000, | 0xxx, | xxxx | binary |
| (7) AND with (3) | 0000, | xxxx, | xxxx, | xxxx | binary |

(7)is now the pointer offset for the system of data points. $I_{(PB, FB)}$
(7) + 1 = $I_{(PB+1, FB)}$
(7) + $2^5$ = $I_{(PB,FB+1)}$ Once the truncated stored data point is identified, the neighboring points are also identified as shown in FIG. 3A. The truncated stored data point $I_{(pbase,fbase)}$ is shown as the lower left data point. A stored data point representing the same force output at one increased position unit $I_{(pbase+1,fbase)}$ is shown as the lower right data point. A stored data point representing an additional unit of force output at the same position $I_{(pbase,fbase+1)}$ is shown as the upper left data point, and a stored data point representing one increased force unit and one increased position unit $I_{(pbase+1,fbase+1)}$ is shown as the upper right data point. If the resolution of the data points is high relative to the rate of change of the waveform, the four identified data points form a parallelogram as shown in FIG. 3B because the relative slopes from I(pb,fb)→(Ipb+1,fb) and I(pb,fb+1)→I(pb+1,fb+1) are approximately the same (see FIG. 3B). If the rate of change of the waveform is relatively large, errors will be induced by the parallelogram approximation as the actual shape becomes more rhombus-like in geometry.

Once the processor has identified three of the four stored data points surrounding the "actual current location" of the motor 100, the processor computes the actual phase current needed to provide the desired force output for the instantaneous position of the motor. Specifically, the actual current to be delivered to one using the following equation:

$$I_{phase} = I_{(pbase,fbase)} + [(I_{(pbase+1,fbase)} - I_{(pbase,fbase)})/pos\ res] \times delta\ pos + [(I_{(pbase,fbase+1)} - I_{(pbase,fbase)})/force\ res] \times delta\ force$$

In the above equation, "pos res" is the truncation factor of the position and "delta pos" is the truncated portion of the position, "force res" is the truncation factor of the force and "delta force" is the truncated portion of the force.

In the preferred embodiment discussed above, since the resolutions of the position and force vectors are factors of two from the system resolution, the two division operations are simply bit shifts. Therefore, the processor need only perform two subtraction functions, two bit shifts, two multiplication functions, and two addition functions to calculate the current output using the above-recited equation. These functions may be formed efficiently and quickly using known processors.

Once the phase current for one phase (e.g., phase A) of the motor 100 has been determined, the phase currents for the other two phases (e.g., phases B and C) of the motor 100 may be determined using the same process. Notably, the relevant section of the force/position plane (see FIG. 2) is the same as for the first phase except that it is shifted by 120 degrees. This position offset is constant, thereby allowing for rapid pointer movement to the appropriate portion of the force/position plane.

By using the storage, identification, and calculation steps described above, the phase current output needed for each phase of the motor 100 to achieve a desired force output is rapidly and efficiently calculated.

Figure 4:
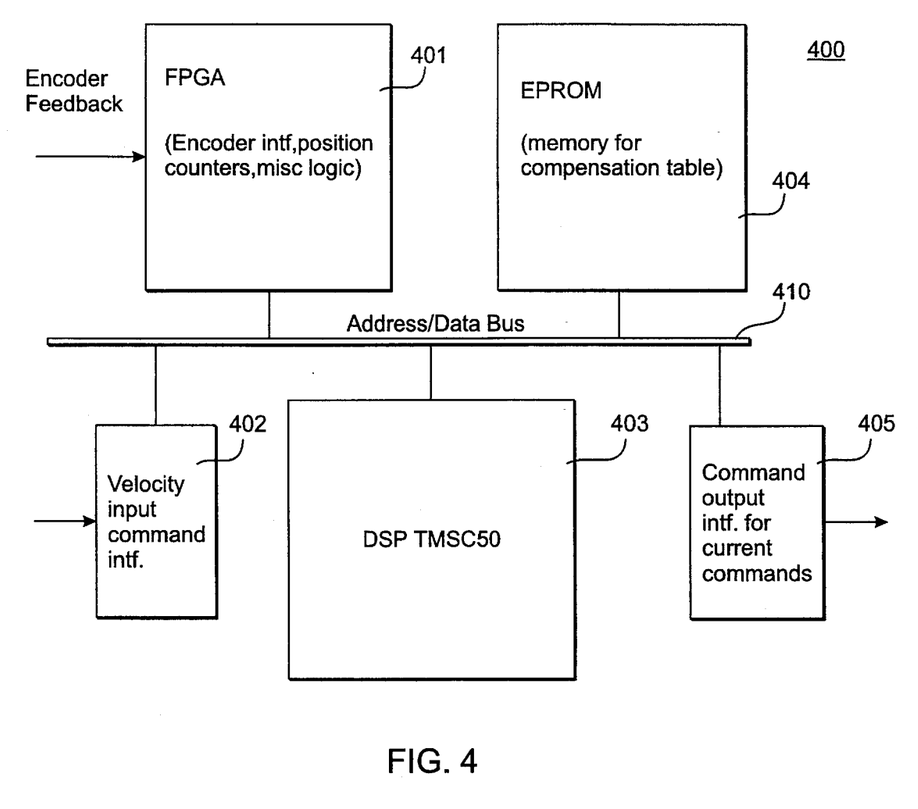
FIG. 4 provides a schematic block circuit diagram of the commutation controller according to the present invention.

With reference to FIG. 4, an apparatus according to the present invention comprises a commutation controller 400. The controller 400 includes a field programmable gate array (FPGA) 401 which, inter alia, receives feedback from the sensor(s) 104. The feedback signals represent the instantaneous position for the motor 100. A velocity input command interface 402 received velocity commands from a motion controller for the motor 100. A processor 403 receives the feedback information from the FPGA 401 and velocity input commands from the interface 402 via an address/data bus 410.

A memory 404, for example, an EPROM, stores the data points representing the intersection points on the force/position plane of FIG. 2. The processor 403 retrieves the stored data points from the memory 404 via the address/data bus 410 and performs the process of calculating the required phase currents in real time for each phase of the motor 100 as described above with reference to FIGS. 3A and 3B.

Figure 5A:
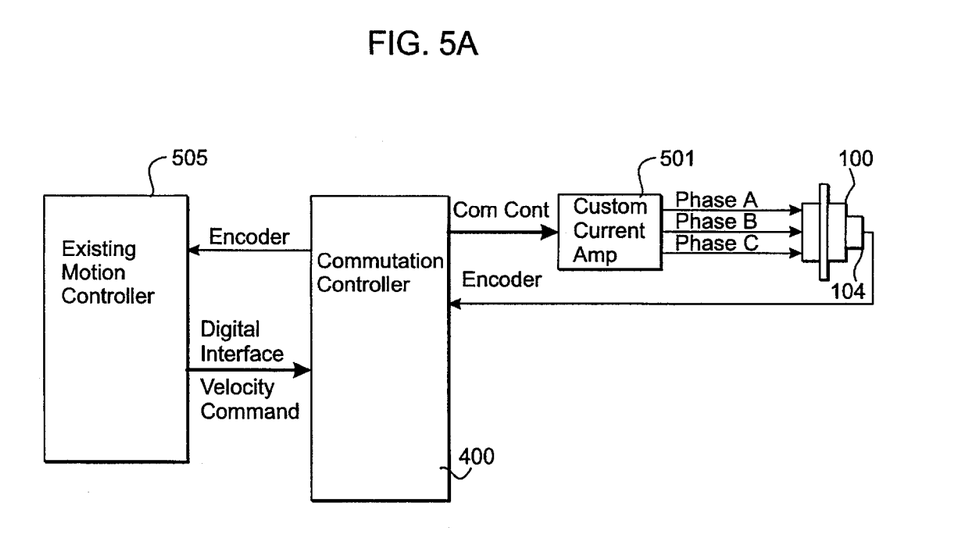
FIG. 5A provides a block diagram showing the interrelationship between one controller of FIG. 4 and other components of the system of the present invention for use in controlling the force output of a variable reluctance motor into which the commutation controller of FIG. 4 is incorporated.

The processor then generates commands corresponding to the calculated amount of phase current needed for each phase of the motor 100 and outputs these commands to command output interface for current commands 405 via the address/data bus 410. With reference to FIG. 5A, there is shown in block diagram form the relationship between controller 400 (FIG. 4) and other components of the system of the present invention. The commands generated by commutation controller 400 are provided to a custom current amplifier 501 which generates the appropriate phase current inputs for each phase A, B, and C of the motor 100. These currents are respectively provided to the coils of each phase A, B, and C. The sensor(s) 104 provide feedback to the commutation controller 400 indicating the current position of the motor as discussed above. The commutation controller 400 also provides the feedback from the sensor(s) 104 to a motion controller 505. Motion controller 505 generates velocity commands in response to the feedback signals and provides the velocity commands to the commutation controller 400 via velocity input command interface 402 (see FIG. 4). In one embodiment of the present invention, the commutation controller closes the velocity loop. The actual force command is the output of the velocity error control block 520 in FIG. 5B.

The processor 403 of commutation controller 400 may be a highly integrated DSP, for example, a TMS320C50 processor manufactured by Texas Instruments. Memory 404 may be an EPROM or other suitable memory device. In the preferred embodiment described above, the memory 404 stores data points for 32 force levels and 16 counts/segments, requiring a memory size of less than 10 Kilowords or 20 Kilobytes.

The sensor(s) 104 for providing feedback signals to commutation controller 400 may be LIDA 201 exposed linear encoders manufactured by Heidenhain in Germany. However, numerous other types of sensors may be used to provide the necessary feedback signals.some such sensors are described at pages 5–28 of "Digital Linear and Angular Metrology" by Alfons Ernst, published in 1989 by Verlag Moderne Industrie AG & Co., and incorporated herein by reference.

Figure 5B:
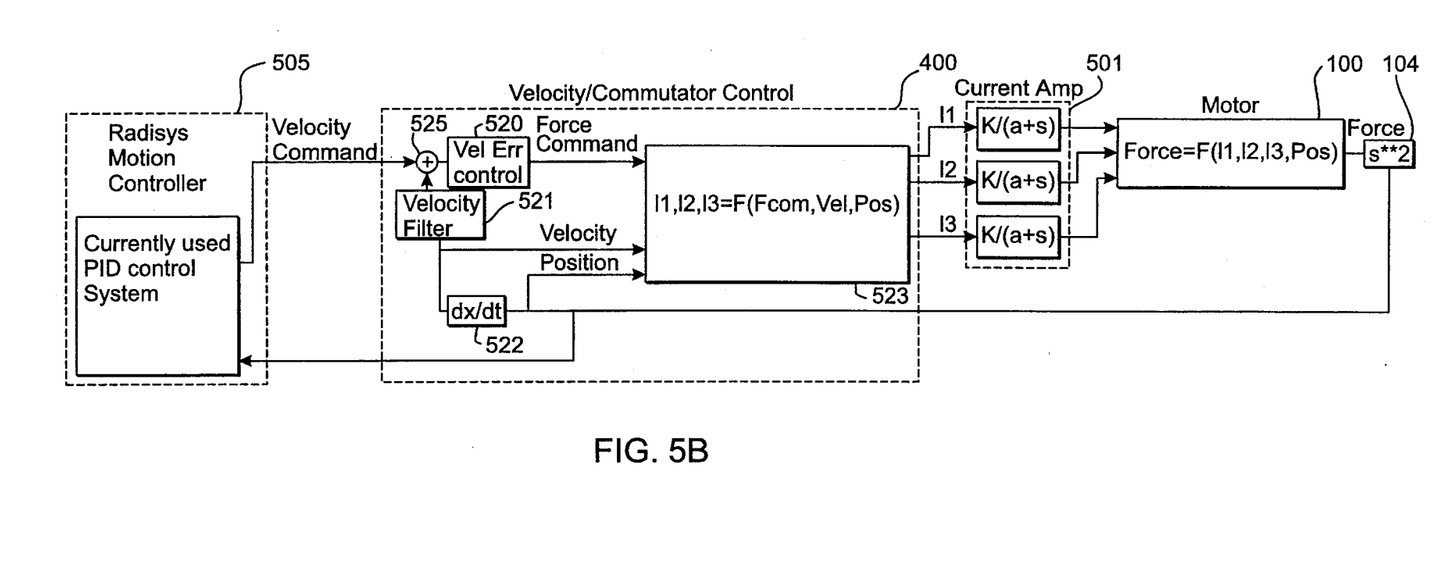
FIG. 5B provides a functional schematic diagram of the commutation controller of FIG. 5A.

With reference to FIG. 5B, functional detail of the commutation controller 400 of FIG. 5A are shown in greater detail. A commutation controller 400 for use in the present invention includes a value error control circuit 520 for outputting an actual force command, a velocity filter 521, a summing circuit 525, a differentiating circuit 522 for differentiating a position value (x) read by sensor 104 over time (t) to obtain a velocity value (dx/dt), and a processor 523. Processor 523 receives the actual force command from value error control circuit 520, a velocity input from differentiator circuit 522, and a position input from sensor 104 and generates a corresponding command to custom current amplifier 501 for each phase of the motor 100.

Figure 6A:
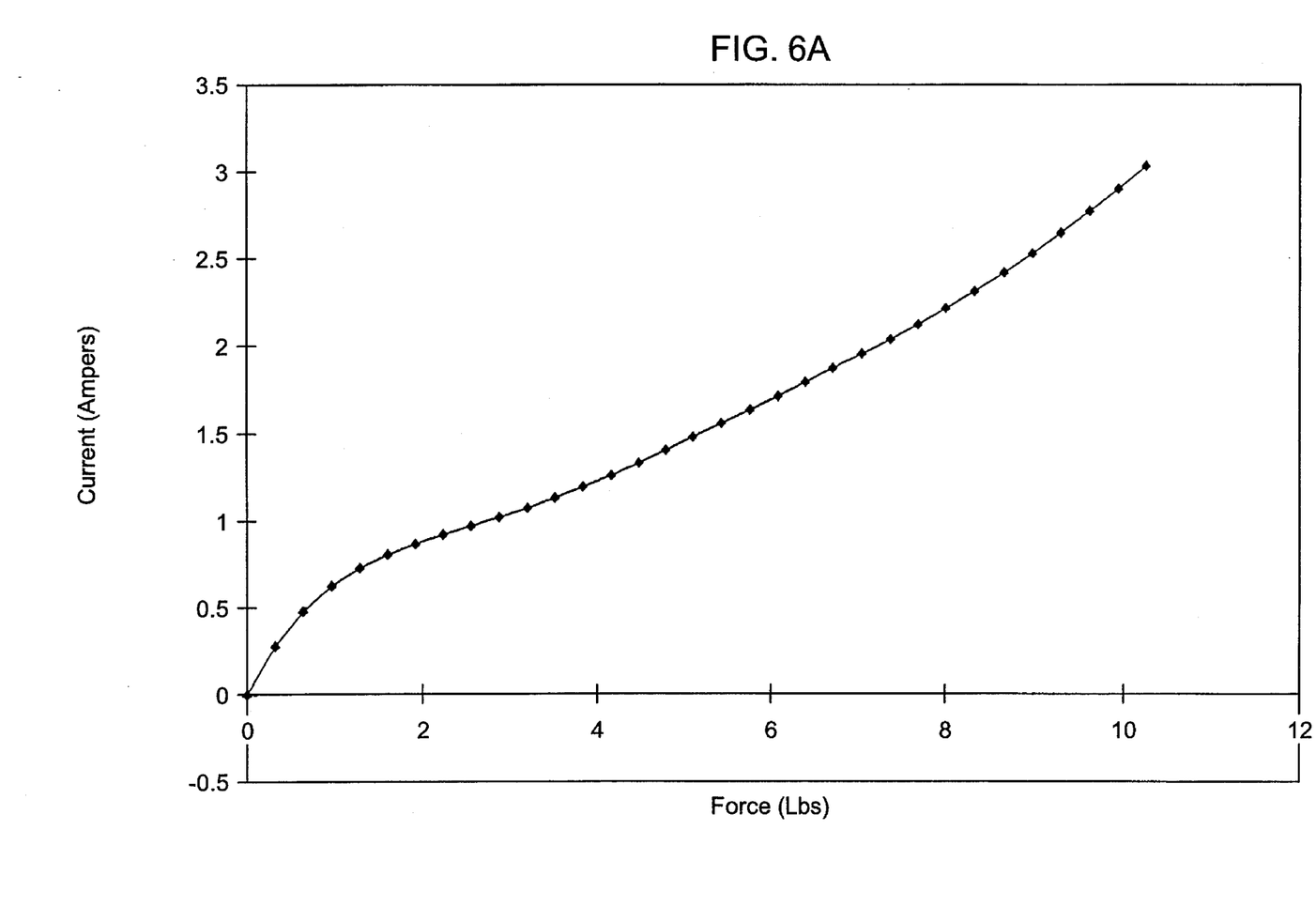
FIGS. 6A, 6B, and 6C provide graphs of the behavior of a variable reluctance motor controlled with the apparatus and method according to the present invention.
Figure 6B:
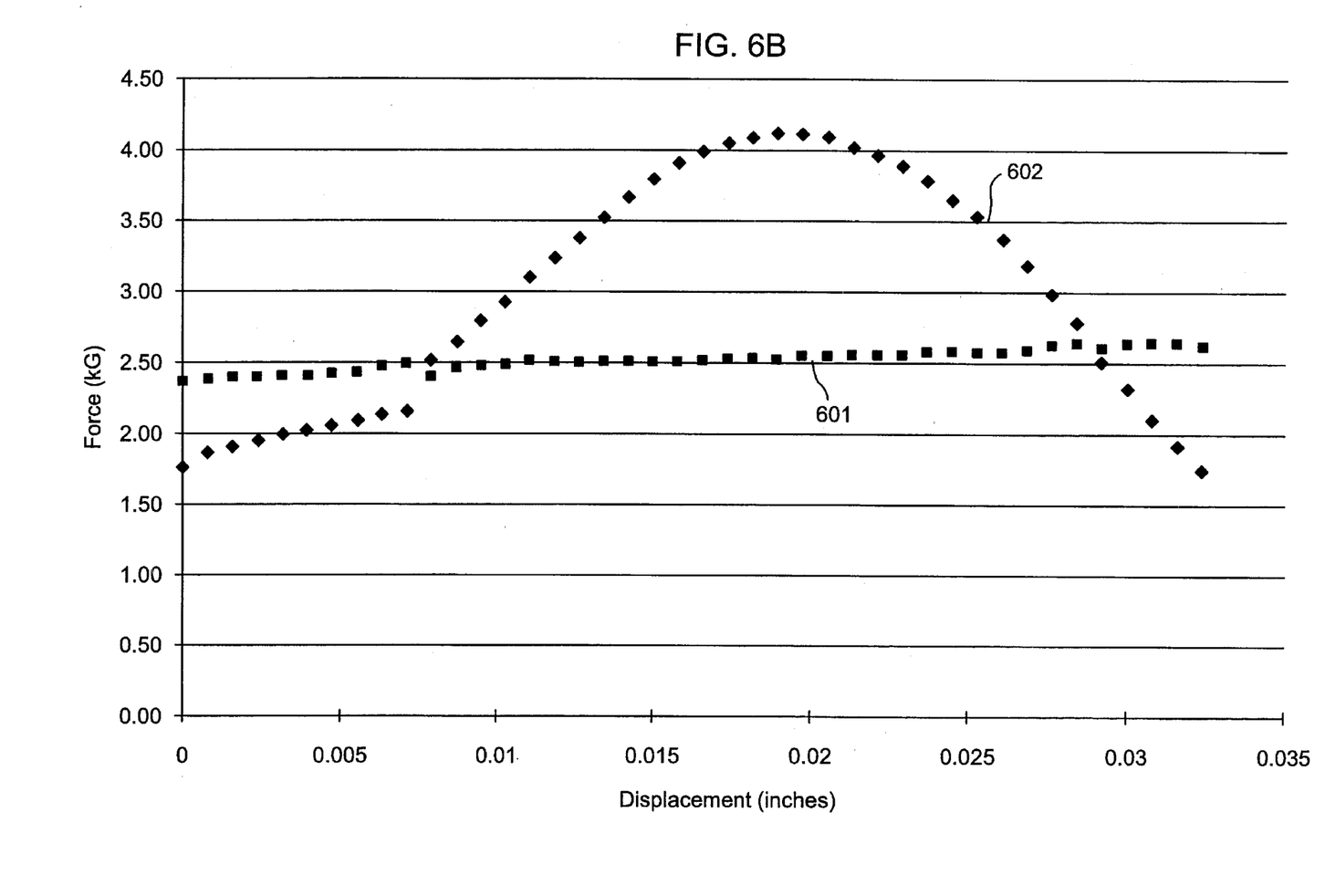
Figure 6C:
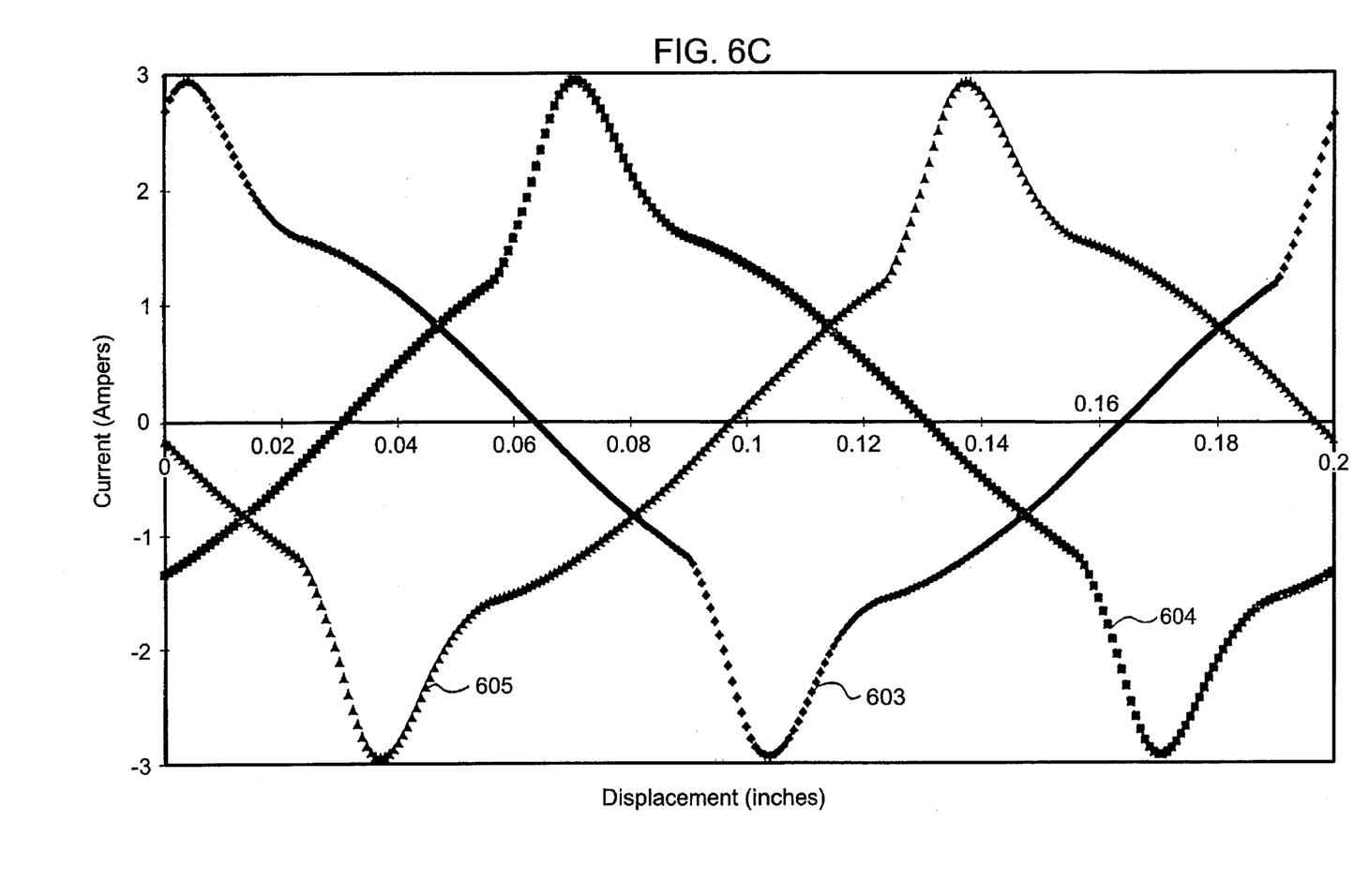

FIGS. 6A, 6B, and 6C provide graphs of the performance of a variable reluctance motor incorporating the method and apparatus according to the present invention. FIG. 6A illustrates the required phase current values needed for increasing force outputs at one particular position orientation. FIG. 6B illustrates the force output of a motor controlled using the method and apparatus according to the present invention (graph 601) in comparison to a motor without compensation (graph 602). FIG. 6C provides an illustration of the current in each phase of the motor 100 versus the position of the motor for one particular constant force output. Graph 603 illustrates the current in the coil of phase A, graph 604 illustrates the current in the coil of phase B, and graph 605 illustrates the current in the coil of phase C.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

We claim:

1. A method of force compensation in a variable reluctance motor, comprising the steps of:

obtaining instantaneous motor position data for said variable reluctance motor;

using a truncated value of said instantaneous motor position data and desired force command to identify a selected stored data point from a plurality of stored data points, said stored data points each representing a phase current value, and said selected stored data point having position and force values numerically closest to said instantaneous motor position data and said desired force command respectively;

interpolating a high resolution phase current value based on said selected stored data; and applying a current having said desired phase current value to said variable reluctance motor.

2. The method according to claim 1, wherein said desired phase current value is interpolated using the following equation:

$$I_{phase} = I_{(pbase, fbase)} + [[I_{(pbase+1, fbase)} - I_{(pbase, fbase)}]/pos\ res] \times delta$$

$$pos+[[I_{(pbase,base+1)}-I_{(pbase,base)}]/force\ res]\times delta\ force$$

wherein $I_{(pbase,base)}$ is said selected stored data point; $I_{(pbase+1,base)}$ is a stored data point representing the same force output at one higher position increment than said selected stored data point; and $I_{(pbase,base+1)}$ is a stored data point representing an additional unit of force output at the same position with respect to said selected stored data point.

3. The method according to claim 1, wherein said instantaneous motor position data includes a relative position of a stator of said variable reluctance motor and an armature of said variable reluctance motor.

4. The method according to claim 1, wherein said variable reluctance motor is a multi-phase variable reluctance motor, and a plurality of desired phase current values are calculated, one for each phase of said multi-phase variable reluctance motor.

5. The method according to claim 1, wherein said stored data points represent selected points on a position/force plane which represents the empirical behavior of said variable reluctance motor.

6. An apparatus for force compensation in a variable reluctance motor, comprising:

a sensor coupled to said variable reluctance motor for obtaining instantaneous motor position data; and a controller coupled to said sensor for receiving said instantaneous motor position data and desired force command, said controller comprising means for comparing said instantaneous motor position data and said desired force command with a plurality of stored data points, each said stored data point representing a phase current value, said comparing means identifying a selected stored data point having position and desired force values numerically closest to said instantaneous motor position data and said desired force command respectively;

means for interpolating a higher resolution phase current value based on said phase current value of said selected stored data point;

means for generating a current having said desired phase current value; and means for outputting said current to said variable reluctance motor.

7. The apparatus according to claim 6, wherein said desired phase current value is interpolated using the following equation:

$$I_{phase}=I_{(pbase,base)}+[[I_{(pbase+1,base)}-I_{(pbase,base)}]/pos\ res]\times delta\ pos+[[I_{(pbase,base+1)}-I_{(pbase,base)}]/force\ res]\times delta\ force$$

wherein $I_{(pbase,base)}$ is said selected stored data point; $I_{(pbase+1,base)}$ a is a stored data point representing the same force output at one higher position than said selected stored data point; and $I_{(pbase,base+1)}$ is a stored data point representing an additional unit of force output at the same position with respect to said selected stored data point.

8. The apparatus according to claim 6, wherein said instantaneous motor position data includes a relative position of a stator of said variable reluctance motor and an armature of said variable reluctance motor.

9. The apparatus according to claim 6, wherein said variable reluctance motor is a multi-phase variable reluctance motor, and a plurality of desired phase current values are calculated, one for each phase of said multi-phase variable reluctance motor.

10. The apparatus according to claim 6, wherein said stored data points represent selected points on a position/force plane which represents the empirical behavior of said variable reluctance motor.

* * * * *